June 14, 1938.   W. KUNDEL   2,120,807
DEVICE FOR SOAPING FLOWING WATER
Filed June 29, 1937   2 Sheets-Sheet 1
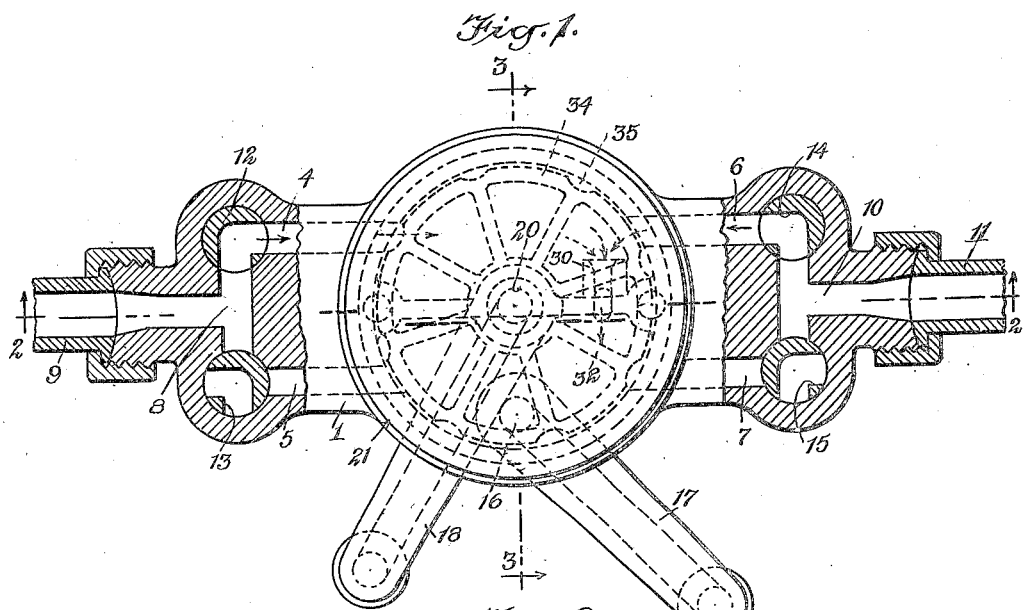
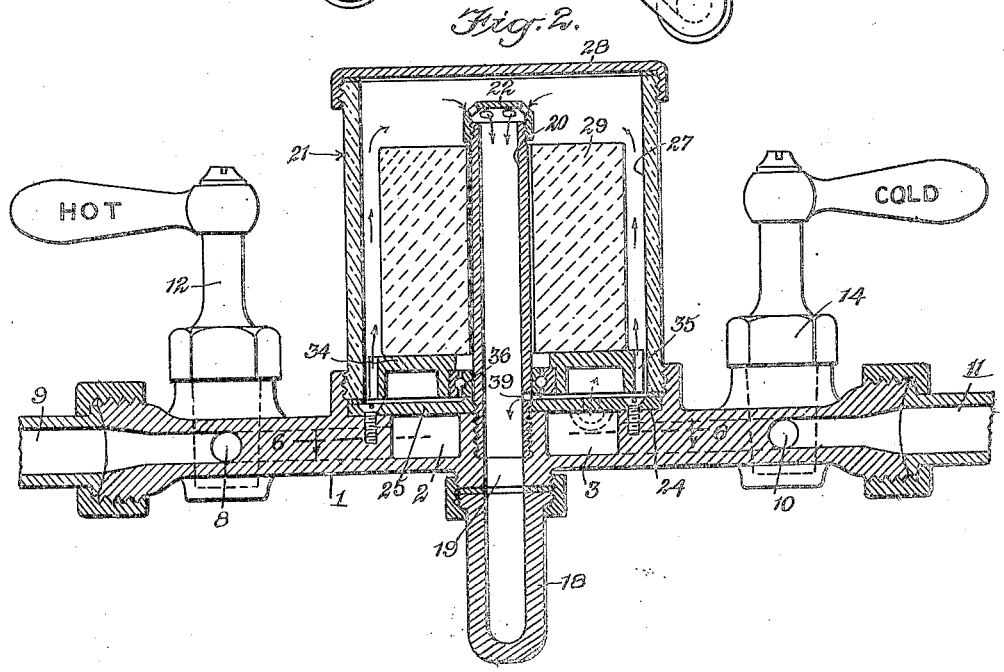
WITNESSES
INVENTOR
William Kundel
BY
ATTORNEYS June 14, 1938. W. KUNDEL 2,120,807
DEVICE FOR SOAPING FLOWING WATER
Filed June 29, 1937 2 Sheets-Sheet 2
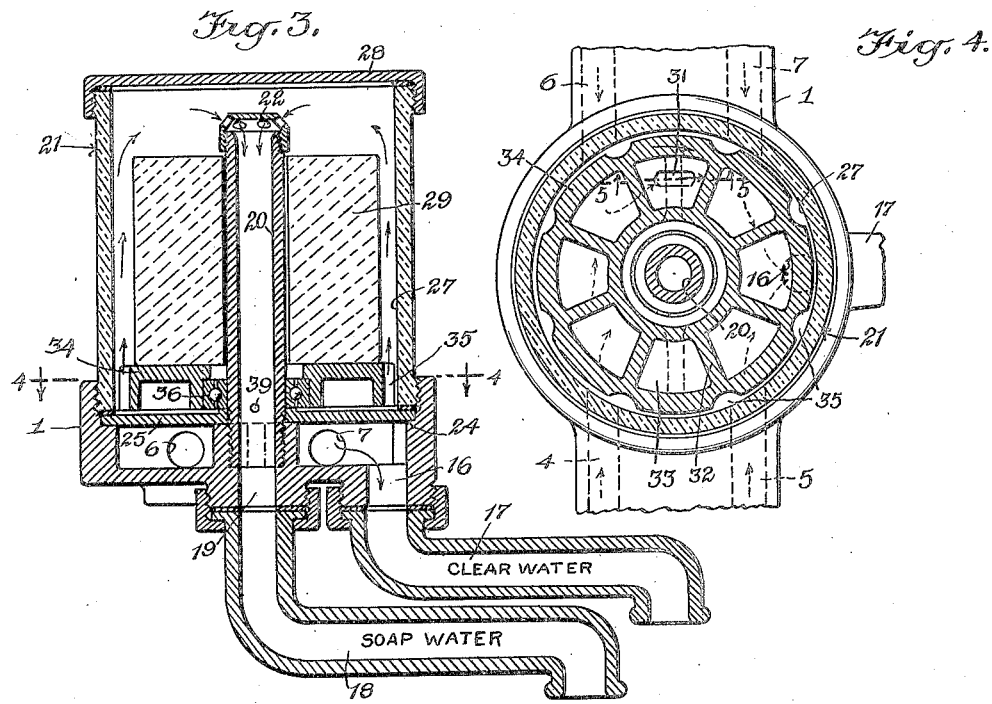
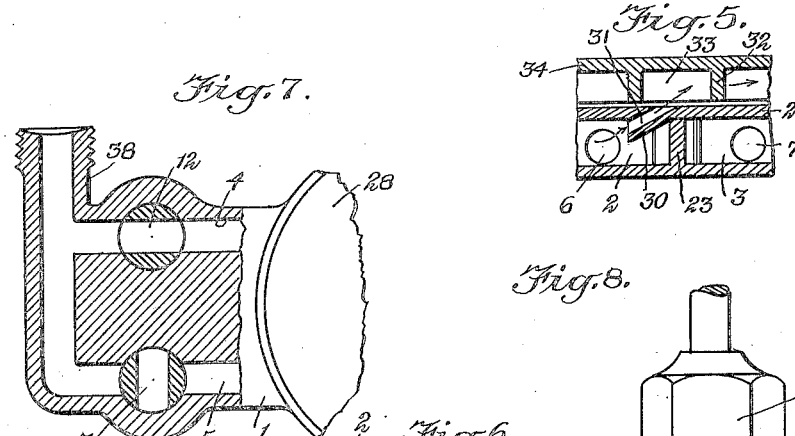
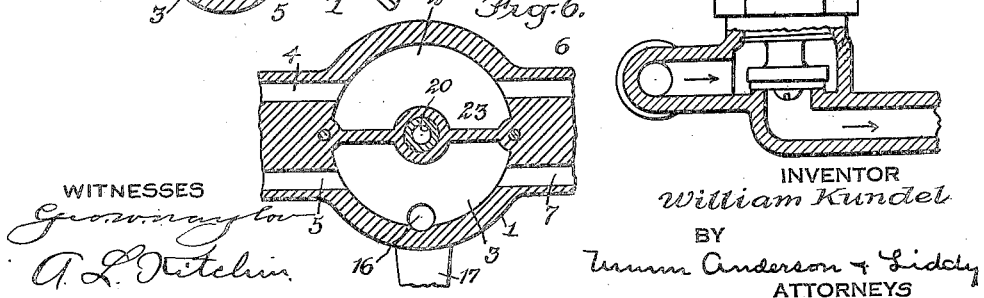

Patented June 14, 1938

2,120,807

UNITED STATES PATENT OFFICE 2,120,807

DEVICE FOR SOAPING FLOWING WATER

William Kundel, Hoboken, N. J., assignor of one-half to Joseph Parisi, Jersey City, N. J.

Application June 29, 1937, Serial No. 150,944

2 Claims. (Cl. 299—84)

This invention relates to a device for soaping flowing water and has for an object to provide an improved construction wherein means are provided which will permit the dispensing from the valve of hot or cold soapy water.

A further object of the invention is to provide a device having a container attachment and associated parts for receiving soap and for directing either hot or cold water through the container in contact with the soap so that soapy water may be discharged as desired.

A further and more specific object of the invention is to provide a valve which may dispense soapy water and wherein a rotating soap carrier is used to carry the soap mixed with the water passing out the outlet of the valve.

In the accompanying drawings:

Fig. 1 is a top plan view of a device disclosing an embodiment of the invention, certain parts being broken away for illustrating certain detailed features;

Fig. 2 is a longitudinal sectional view through Fig. 1 approximately on the line 2—2;

Fig. 3 is a transverse sectional view through Fig. 1 approximately on the line 3—3, the outlet members being arranged in parallelism;

Fig. 4 is a sectional view through Fig. 3 approximately on the line 4—4;

Fig. 5 is a detailed fragmentary vertical sectional view through Fig. 4 approximately on the line 5—5;

Fig. 6 is a sectional view through Fig. 2 approximately on the line 6—6;

Fig. 7 is a view similar to the left hand end of Fig. 1, except that the inlet is shown as a modified structure;

Fig. 8 is a fragmentary view partly in elevation and partly in section showing a modified form of valve to that used in Figs. 1 and 2.

Referring to the accompanying drawings by numerals, 1 indicates the body of the device which is provided with chambers or compartments 2 and 3 into which discharge the various inlet passageways 4, 5, 6 and 7. Passageways 4 and 5 are connected by a T-shaped passageway 8 which also connects with an inlet pipe 9. In a similar manner passageways 6 and 7 are connected by a T-shaped passageway 10 having one leg of the passageway registering with the inlet pipe 11. Pipe 11 is adapted to permit cold liquid, as for instance cold water, to enter the valve, while pipe 9 is adapted to guide hot liquid, as for instance hot water, to the valve. It will therefore be seen that passageways 4 and 5 supply hot water to the compartments 2 and 3, while passageways 6 and 7 supply cold water to the same compartments. Valve members 12 and 13 control the water flowing through passageways 4 and 5, while similar valve members 14 and 15 control the water flowing through passageways 6 and 7. By properly setting these valves either hot or cold water may be supplied to either or both chambers. Also by varying the setting a mixture of hot and cold water may be supplied.

As shown in Fig. 3, chamber or compartment 3 has an outlet 16 opening into the tubular outlet member 17 whereby member 17 always discharges clear water, although it may be hot, cold or a mixture. The outlet tubular member 18, however, always supplies soapy water as it is connected through the opening 19 and tube 20 with the upper part of the container 21. A perforated cap 22 is preferably arranged at the upper end of tube 20, although this is not essential. The container 21 receives water from chamber 2 and in fact all the water from chamber 2 must pass through container 21 before it can reach the outlet or outlet tubular member 18.

The chambers 2 and 3 are separated by a partition 23 which is of the same height as the annular shoulder 24 formed on the body 1. A closure plate 25 rests on shoulder 24 and on the division member 23. On top of this closure plate is arranged a washer or gasket 26 which is pressed by the lower edge of the wall 27 of container 21, which wall is preferably glass although it could be made from other material. By this arrangement there can be no leakage from either compartment. It will also be noted that the wall 27 is threaded into body 1 and is provided with a screw cap 28. This is desirable in order that the supply of soap 29 may be renewed from time to time. As shown in Fig. 3, the soap is shown as a ring fitting loosely over tube 20, but small pieces of soap could be used if desired.

The closure plate 25 is provided with an enlargement 30 having a passageway or aperture 31 as shown in Fig. 5. This aperture or passageway is at an angle to the plane of rotation of the rotatable soap supporting member so that water passing therethrough will strike the various walls 32 of the buckets 33 formed in the lower part of the rotating member 34. The rotating member 34 is a wheel-like member provided with notches 35 in the periphery to permit a free circulation of water. This wheel or member is supported by a suitable ballbearing structure 36 whereby it may freely rotate and consequently rotate the soap 29 which is carried thereby. The soap will remain stationary except when water is passing through the container. It will therefore be seen that when either of the valves 12 or 14 is turned on water will pass into chamber 2 and will find its way through the aperture 31 into container 21. After having given the member 34 a rotary impulse the water passes as indicated by the arrows in Fig. 3 so that it will be discharged out through tube 20 and the tubular member 18. When either or both of the valves 13 or 15 are turned on clear water will pass into the chamber 3 and from thence out the tubular outlet member 17. Preferably members 17 and 18 are swingably mounted by a well known construction.

A certain type of valve member has been shown in Fig. 1 as valves 12 to 15, but if desired other forms of valves may be used without departing from the spirit of the invention, as for instance valve 37 shown in Fig. 8. In Fig. 1 the hot and cold water are led to the valve by pipes 9 and 11 and these pipes are connected to the body 1 at opposite ends thereof. However, if desired the pipes 9 and 11 could be connected on top or bottom or at some other place, for instance at the rear as shown in Fig. 7. From this figure it will be seen that the supply pipe is connected to the rearwardly projecting tubular extension 38.

From Fig. 3 it will be seen that there is provided a vent 39 entering into the tube 20 so that when water is turned off of chamber 2 the liquid in the chamber 21 will gradually pass through vent 39 and out the tubular outlet 18.

I claim:

1. A device of the character described for liquids formed with a body having a compartment open at the top, a closure plate for closing said compartment, a rotatable soap supporting member carried by said closure plate, said closure plate having an aperture opening into said compartment arranged at an angle to the plane of rotation of said soap supporting member, said rotatable soap supporting member being formed with pockets in the lower face thereof presenting impelling buckets positioned so that liquid passing through said aperture in said closure plate will strike the walls thereof and rotate said soap supporting member, a tube carried by said body and extending through said closure plate and said soap supporting member, said tube being open at the top and bottom, means enclosing said tube and said soap supporting member presenting a container, a tubular swinging outlet member positioned with one end in registry with the bottom end of said tube, said body being formed with a hot liquid inlet passageway for said compartment and a cold liquid inlet passageway for said compartment, and a valve member for each of said passageways for controlling the flow of liquid through the respective passageways.

2. A device of the character described for controlling the flow of water formed with a body having a compartment open at the top and a pair of inlet passageways for said compartment, a valve member for each passageway for controlling the passage of water therethrough, a closure plate for closing the top of said compartment, an inclined aperture in said closure in free communication with said compartment, a rotatable soap carrying member positioned above said closure plate, said soap carrying member having means acting as impelling buckets against which the water passing through said aperture strikes for rotating said soap carrying member, a closed top tubular member coacting with said body and said closure plate presenting a soap container, and a tubular member acting as an outlet for said container.

WILLIAM KUNDEL.